March 14, 1967     G. N. GOOLSBY, JR     3,309,639

SOUND REDUCING MEANS FOR ELECTRICAL REACTORS

Filed May 12, 1965     2 Sheets-Sheet 1

INVENTOR
George N. Goolsby, Jr.

BY
Donald R. Lackey
ATTORNEY

March 14, 1967  G. N. GOOLSBY, JR  3,309,639
SOUND REDUCING MEANS FOR ELECTRICAL REACTORS
Filed May 12, 1965  2 Sheets-Sheet 2

United States Patent Office 3,309,639
Patented Mar. 14, 1967

3,309,639
SOUND REDUCING MEANS FOR ELECTRICAL REACTORS
George N. Goolsby, Jr., Sharon, Pa., assignor to Westinghouse Electric Corporation, East Pittsburgh, Pa., a corporation of Pennsylvania
Filed May 12, 1965, Ser. No. 455,207
5 Claims. (Cl. 336—100)

This invention relates in general to electrical inductive apparatus, such as reactors, and more particularly to air core, air insulated reactors.

Air core, air insulated reactors are utilized to introduce inductance into electrical power systems and are commonly connected to an auxiliary winding of a power transformer in order to reduce the voltage applied to the reactor. Thus, the same low sound requirements for power transformers are also applied to any associated reactors. This, along with the fact that electrical utilities are becoming more stringent in their sound specifications, presents a difficult problem to the reactor design engineer. The usual method of reducing the sound level of an air core, air insulated reactor is to stiffen the reactor assembly so that a portion of the natural frequencies of the apparatus are outside the limits of audibility. This method produces extremely limited results, however, as a natural frequency is proportional to the square root of stiffness to mass. Therefore, if the stiffness of the assembly is increased four times, without increasing mass, a particular natural frequency would only be doubled. Other methods, such as enclosing the reactor completely within an enclosure is impractical from a cost standpoint, and the prevention of the transmission of airborne sounds through the walls of the enclosure also presents a difficult problem.

It would be desirable if the noise level of an air core reactor could be substantially decreased without resorting to extensive mechanical changes in the reactor structure, or without resorting to enclosing the reactor within a complete sound isolating enclosure. It would further be desirable to obtain a substantial reduction in the noise level of an air core, air insulated reactor without significantly increasing the cost of the apparatus.

Accordingly, it is an object of the invention to provide a new and improved air core, air insulated reactor assembly.

Another object of the invention is to provide a new and improved, low sound level, air core, air insulated reactor assembly.

A further object of the invention is to provide a new and improved air core, air insulated reactor assembly in which a portion of the sound energy is eliminated, and the remaining sound energy dampened, without substantially increasing the manufacturing cost of the assembly.

Briefly, the present invention accomplishes the above cited objects by providing a chamber, having one open end, constructed of sound absorbing material. This chamber is disposed between the bottom of the reactor assembly and the earth or mounting pad, with the open end of the chamber being disposed against the bottom portion of the reactor assembly, to enclose at least a portion of the air space between one end of the reactor winding and the mounting pad. It has been found that a substantial portion of the sound energy produced by an air core, air insulated reactor is radiated from the bottom portion of the reactor assembly, due in part to the amplification of the sound energy due to volume acoustical resonance of the air column which exists in the central opening or passageway of the reactor. By enclosing the bottom portion of the reactor in a chamber constructed of sound absorbing material, acoustical resonance is substantially reduced or eliminated by the damping effect of the sound absorbing material. The sound energy radiated from the structure is also reduced due to absorption of a portion of the energy in the sound absorbing material. Thus, the overall sound level of the reactor assembly is substantially reduced, without resorting to changes in the structural design of the reactor assembly itself, and without attempting the difficult and expensive construction of a sound isolation room, which attempts to prevent the sound energy from passing through the walls of the room by expensive vibration isolating materials.

Further objects and advantages of the invention will become apparent as the following description proceeds and features of novelty which characterize the invention will be pointed out in particularity in the claims annexed to and forming a part of this specification.

For a better understanding of the invention, reference may be had to the following detailed description, taken in connection with the accompanying drawings, in which.

Figure 2:
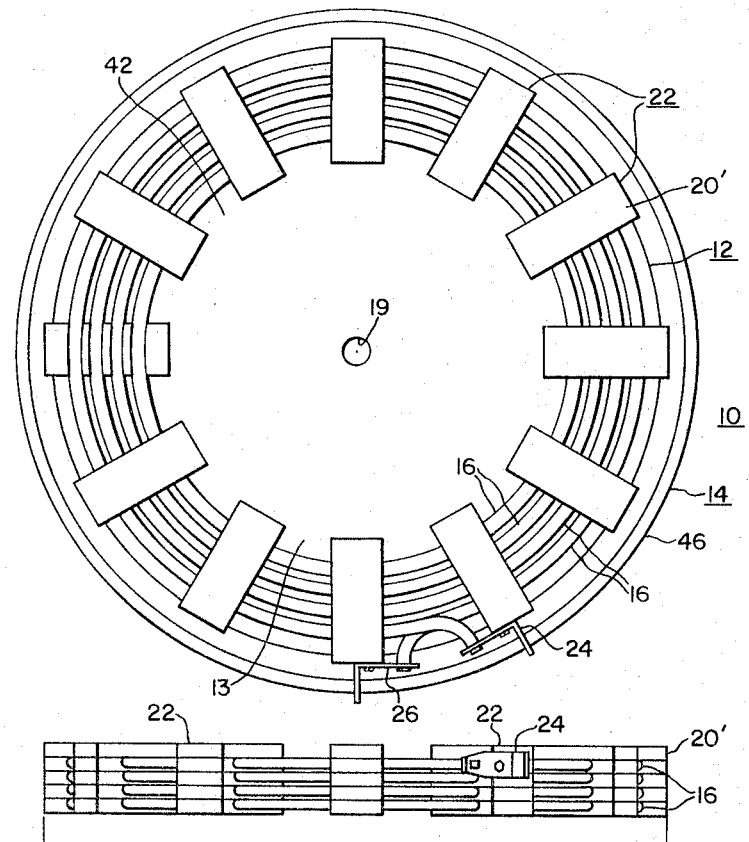
FIG. 2 is a plan view of the reactor assembly shown in FIG. 1.
Figure 1:
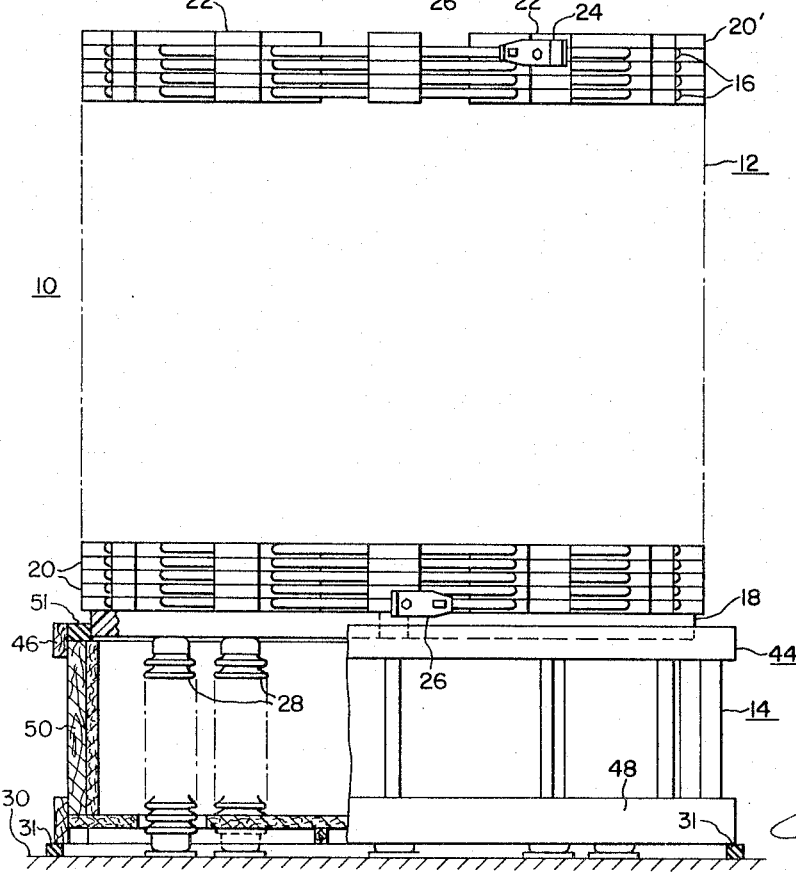
FIGURE 1 is an elevational view of an air core, air insulated reactor assembly constructed according to the teachings of the invention.

Referring now to the drawings, and FIGS. 1 and 2 in particular, there is shown a single phase, air core, air insulated reactor assembly 10, constructed according to the teachings of the invention. In general, reactor assembly 10 includes a conventional air core, air insulated winding assembly or portion 12, and a sound chamber 14 constructed of sound absorbing material, disposed to enclose the bottom portion of winding assembly 12.

The air core, air insulated winding portion 12 has a substantially vertical passageway or air space 13 therein, which interconnects upper and lower openings to the winding portion 12. The winding portion 12 is constructed of a plurality of superposed layers of electrical conductor turns 16, which are wound about the same vertical axis, formed of copper or aluminum, and covered with a suitable weatherproof electrical insulating material, such as glass insulated tape. The winding assembly 12 is built on a heavy circular electrical insulating member 18, which may be concrete, asbestos lumber, or any other suitable material. Insulating member 18 may be substantially solid in order to also serve as a heat barrier, but may have a small central opening 19 for handling purposes. A plurality of conductor holding and locating members 20, formed of a suitable electrical insulating material, such as glass filled epoxy, are attached to circular member 18 at predetermined spaced intervals. Conductor holding and locating members 20 have a plurality of grooves disposed in their upper surface, in which the conductor turns 16 are disposed when winding the turns. Members 20 may have substantially flat bottom surfaces, or they may be tapered to lengthen the surface and increase the electrical strength of the members. Locating members 20 may each have one or more conductor turns 16 per layer, which turns may be serially connected or connected in parallel, depending upon the particular requirements of the reactor assembly 10. When one layer of conductor turns 16 is completed, additional holding members 20 are placed directly over and attached to each of the holding members in the preceding layer, by a suitable weatherproof adhesive, such as an epoxy. The bottom portions of the newly placed holding members 20 thus act as tops for the proceeding layer of conductor turns 16, confining the conductor turns 16 within the grooves. FIGURE 2 illustrates each layer of conductor turns 16 as being four turns, but any number may be employed. This procedure, of adding new holding and locating members 20, and attaching them to the immediately preceding holding member 20 with a suitable adhesive, continues until the required number of turns are achieved, and then a top member 20' is placed over and attached to the last holding member 20, which is similar to the other holding members, except it doesn't require grooves on its upper surface. The plurality of vertical columns 22 formed by the stacked holding members 20, supports the plurality of conductor turns 16, providing the necessary mechanical strength required to withstand short circuit stresses, and they also make the winding assembly 12 rigid, which keeps the natural frequencies of the structure as high as possible. The spaced vertical columns 22 also allow adequate air space around the conductor turns 16 to allow them to be air insulated and air cooled, as the structure is formed completely of weatherproof materials and mounted outside without the necessity of an enclosure. The substantially solid mounting member 18 forces air to flow through the sides of the winding assembly 12 and over the conductor turns, and up through the inner opening 13 of the winding assembly 12, due to chimney effect. Suitable terminal connections 24 and 26 are connected to the start and finish ends of the conductor turns 16.

The complete winding assembly 12 is insulated from ground, by attaching a plurality of electrical insulators 28 around the periphery of circular electrical insulating member 18, with the insulators 28 extending downwardly from and perpendicular to the circular member 18, to form the mounting means or mounting feet for the winding assembly 12.

Air core, air insulated reactors connected to a 60 cycle alternating current power system, vibrate in a direction parallel to the columns 22, at a frequency of 120 cycles per second. This vibration of the reactor winding assembly 12 is transmitted to the surrounding air, producing sound energy. The amount of sound energy produced by the winding assembly 12 is reduced as much as practical, by making the assembly rigid. As hereinbefore stated, however, only limited improvement may be realized by stiffening the structure, and the improvement may not be sufficient to bring the reactor within the sound level specifications improved by the electric utility. Placing the reactor assembly 10 within an enclosure, to confine or isolate the sound is very expensive, and defeats the purpose of utilizing an air core, air insulated reactor. This invention teaches how the sound energy radiated by an air core, air insulated reactor may be significantly reduced, without changing the mechanical winding structure of the reactor, and without placing the reactor within an enclosure.

Figure 4:
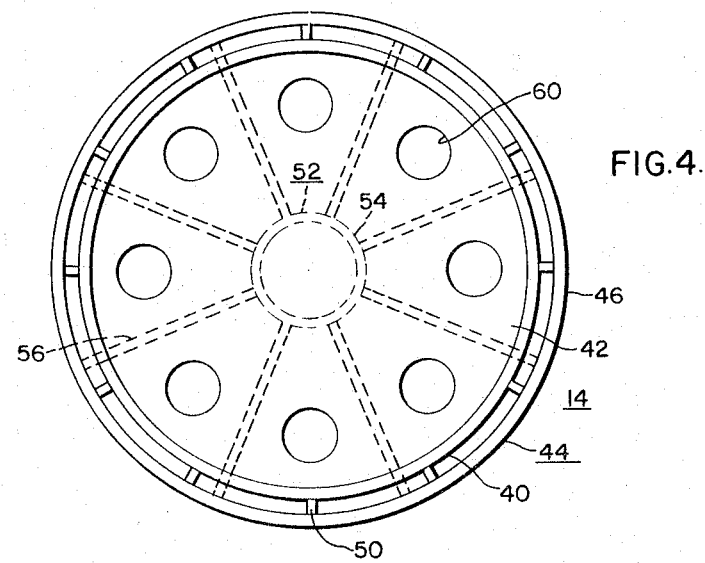
FIG. 4 is a plan view of the sound reducing chamber shown in FIG. 3.
Figure 3:
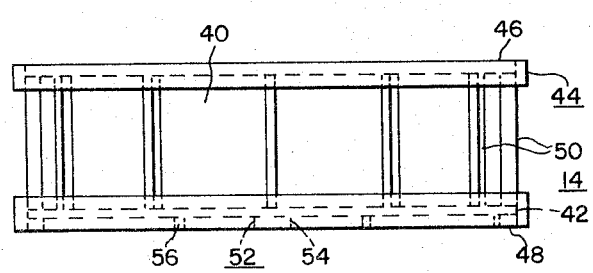
FIG. 3 is an elevational view of a sound reducing chamber constructed according to the teachings of the invention.
Figure 5:
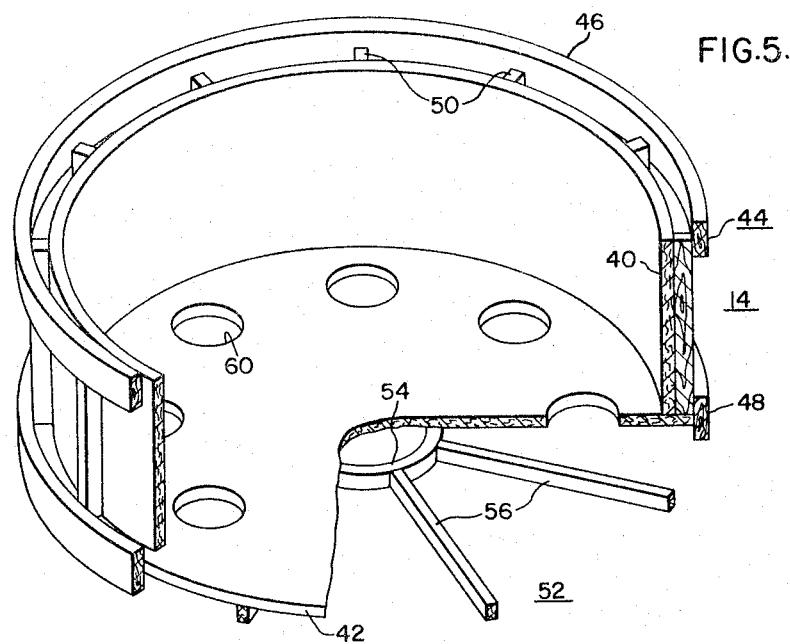
FIG. 5 is a perspective view of the sound reducing chamber shown in FIGS. 3 and 4.

One component of the sound energy produced by the winding structure 12, is due to acoustical or volume resonance, of the air space in passageway 13 and also due to the location of the reactor assembly 10 relative to the ground or mounting pad 30. Acoustical resonance causes the sound to be amplified. If this amplification due to acoustical resonance could be eliminated or substantially reduced, the sound energy radiated from the winding assembly 12 would be significantly reduced. Also, the sound energy striking the mounting pad 30 is reflected into the surrounding air, also adding to the sound level of the reactor assembly 10. FIG. 1 illustrates how the sound energy level of reactor assembly 10 may be substantially reduced, by disposing a sound chamber 14 constructed of sound absorbing material at the bottom of winding assembly 12, to enclose at least a portion of the air space between the winding assembly and the mounting pad 30. The sound reducing chamber 14, which is also shown in elevation, plan, and perspective views in FIGS. 3, 4 and 5, respectively, has a bottom portion 42 and a connecting sidewall portion 40, formed of sound absorbing material.

Any suitable sound absorbing material, such as felt may be utilized. The sidewall portion 40 defines an opening to the chamber 14, which is sized to encompass the bottom portion of the winding assembly 12, including at least a portion of the air space between the winding assembly and the mounting pad.

Sound absorption involves the conversion of sound energy to heat energy, and most porous materials which have many small interconnected openings are usually good absorbers of sound, as the sound energy is converted into heat due to the friction between the moving air and the fibers from which the material is constructed. Some absorption is also due to the sound waves striking the sound absorbing material and setting it in motion. The heat and motion produced is minute, but it produces an appreciable amount of sound absorption.

The bottom and sidewall portions 42 and 40 are arranged to form a complete chamber about one end of winding assembly 12, with sidewall portion 40 having a substantially cylindrical or tubular shape whose central axis coincides with the central axis of the winding assembly 12. The inside diameter of sidewall portion 40 is approximately the same as the outer diameter of the winding assembly 12, and the bottom portion 42 is substantially disc shaped and disposed perpendicular to the central axis of winding assembly 12. The sound absorbing material of which the sidewall and bottom portions 40 and 42 are formed, may be of any desired thickness, with one half inch being very effective for many common sound absorbing materials. Some sound absorbing materials actually experience a slight decrease in absorption when their thickness is increased beyond one half inch.

A suitable cage 44 constructed of wood, plastic or other suitable non-metallic electrical insulating material, is formed to hold the sidewall and bottom portions 40 and 42 in the desired assembled relation. Since a decrease in the rigidity of mounting the sound absorbing material of which the sidewall or bottom portions 40 and 42 are formed, increases the absorption of the material at lower frequencies, such as 120 cycles per second, the cage 44 is constructed in skeleton form.

More specifically, the holding cage 44 may be constructed of spaced, parallel upper and lower circular members 46 and 48, respectively, separated by a plurality of vertical spaced rectangular members 50. Rectangular members 50 may extend only partially across the internal vertical dimension of lower circular member 48, in order to allow space for bottom portion 42 and a lower supporting structure 52. The lower supporting structure 52 may be constructed similar to a wagon wheel, with a hub portion 54 and a plurality of spokes or radial members 56 projecting radially outward therefrom, to connect to the lower circular member 48, or lower supporting structure 52 may be of any other suitable form. By connecting the spoke members 56 into the lower portion of the inside vertical dimension of circular member 48, the bottom sound absorbing portion 42 may be easily placed upon the supporting structure 52, with its outer periphery disposed between the various spoke members and the lower ends of the vertical members 50.

If the chamber 14 is constructed to have a diameter sufficient to encompass the insulating and mounting means 28, suitable close fitting openings 60 may be provided in the bottom portion 42, for allowing the insulating and mounting means 28 to project therethrough.

The chamber 14 may be either mounted on the mounting pad 30, with its own supporting member 31, or it may be pendantly mounted to the winding assembly 12. The cage 44 may be isolated from the winding assembly 12 by vibration isolating means 51, to prevent the vibrations of the winding assembly 12 from being transmitted to the cage 44, although the chamber 14 has been found to effectively reduce the sound level of reactor assembly 10 when secured directly to member 18. The vibration isolating means 51 may be a resilient mounting, such as a properly designed rubber or spring mount, whose natural frequency is substantially less than the lowest vibration component of the winding assembly 12.

The chamber 14 reduces sound energy in many ways: it absorbs airborne sound from the reactor assembly 10 in the sound absorbing material of which the sidewall and bottom portions 40 to 42 are formed, changing a portion of the sound energy to heat and thus reducing the amplitude of the sound energy, it prevents or reduces amplification of the sound energy by eliminating or substantially reducing acoustical resonance, it cancels sound energy by changing its phase, and it substantially reduces reflection of the sound energy from the mounting pad 30. Thus, the sound level of the reactor assembly 10 is substantially reduced by absorbing some of the sound energy which is generated by the reactor assembly 10, by cancelling a portion of the sound energy, and also by preventing additional sound energy from being produced by the process of acoustical amplification.

A 11,270 k.v.a. reactor constructed according to conventional methods had a sound level of 57.0 db 40 when energized from a 60 cycle power source and tested in an ambient of 53.8 db 40. A sound or silencing chamber 14 constructed according to the teachings of this invention was added to the winding assembly 12, and the reactor sound level dropped to ambient or below. This is a significant reduction in sound level, making it possible for the reactor design engineer to meet allowable maximum sound limitations without resorting to expensive changes in the reactor structure or sound isolating enclosures.

Since numerous changes may be made in the above described apparatus and different embodiments of the invention may be made without departing from the spirit thereof, it is intended that all mattter contained in the foregoing description or shown in the accompanying darwings shall be interpreted as illustrative, and not in a limiting sense. For example, it will be obvious that other chamber configurations may be utilized that would be effective in reducing the sound level of the reactor assembly 10, and the construction and specific configuration of chamber 14, shown and described herein, is for illustrative purposes only, and is not meant to limit the broad concept of disposing a chamber constructed of sound absorbing material to cover at least a portion of the air space between the reactor winding assembly and the mounting pad. Also, it will be understood that instead of having the axis of the winding assembly 12 disposed in vertical relation with the mounting pad 30, that it could be disposed in any other direction, relative to the mounting pad, such as horizontal. With this arrangement, a sound chamber 14 could be disposed on both ends of the winding assembly 12, without interfering with vertical air flow across the windings.

I claim as my invention:

1. An air core reactor assembly comprising a winding structure having a passageway therein which interconnects first and second openings, said winding structure including a plurality of layers of electrical conductors disposed about a common axis and means for holding said layers in spaced relation, electrical insulating and mounting means disposed to provide a predetermined distance between said winding structure and ground, and a chamber formed of sound absorbing means, said sound absorbing means including a porous insulating material having a plurality of air spaces therein, said chamber having a bottom portion and sidewall portions which define an opening therein, said chamber being disposed in a substantially concentric side-by-side relation with said electrical insulating and mounting means, with its opening in substantial registry with one of the first and second openings in said winding structure, to enclose the opening in said winding structure with said chamber.

2. An air core reactor assembly comprising a winding structure having a substantially vertical passageway therein which interconnects lower and upper openings to said winding structure, said winding structure including a plurality of superposed layers of electrical conductors disposed about a common axis and means for holding said layers in spaced relation, electrical insulating and mounting means disposed to provide a predetermined distance between said winding structure and ground, and a chamber having a bottom portion and walls formed of a fibrous sound absorbing material which has a plurality of interconnected air spaces therein, said chamber having an opening therein, said chamber being disposed in a substantially concentric side-by-side relation with said electrical insulating and mounting means, with its opening enclosing the lower opening in said winding structure, to enclose at least a portion of the space between said winding structure and ground.

3. An air core, air insulated reactor assembly comprising a winding structure having a substantially vertical passageway therein which interconnects lower and upper openings to said winding structure, said winding structure including a plurality of superposed layers of electrical conductors disposed about a common axis and means for holding said layers in spaced relation, electrical insulating and mounting means disposed to provide a predetermined distance between said winding structure and ground, and a chamber for reducing the sound level of said reactor, said chamber having bottom and sidewall portions formed of substantially porous, fibrous sound absorbing material having a plurality of interconnected air spaces therein, the sidewall portions of said chamber defining an opening therein, said chamber being disposed in a substantially concentric side-by-side relation with said electrical insulating and mounting means, with its opening enclosing the lower opening in said winding structure, including at least a portion of the space between said winding structure and ground.

4. An air core, air insulated reactor assembly comprising a winding structure having a substantially vertical air passageway therein which interconnects lower and upper openings to said winding structure, said winding structure including a plurality of superposed interconnected layers of electrical conductors disposed about a common axis and means for holding said layers in spaced relation, electrical insulating and mounting means disposed to provide a predetermined space between said winding structure and ground, and a chamber for reducing the sound level of said reactor, said chamber having bottom and sidewall portions formed of a substantially porous sound absorbing material which has a plurality of small interconnected openings therein, the sidewall portions of said chamber defining an opening, said chamber being disposed in a substantially concentric side-by-side relation with said electrical insulating and mounting means, with its opening enclosing a predetermined portion of said winding assembly, including the lower opening in said winding structure and at least a portion of the space between said winding structure and ground.

5. An air core, air insulated reactor assembly comprising a winding structure having a substantially vertical air passageway therein which interconnects lower and upper openings to said winding structure, said winding structure including a plurality of superposed interconnected layers of electrical conductors disposed about a common axis and means for holding said layers in spaced relation, electrical insulating and mounting means disposed to provide a predetermined space between said winding structure and ground, and a chamber for reducing the sound level of said reactor, said chamber having bottom and sidewall portions formed of sound absorbing material, the sidewall portions of said chamber defining an opening sized to enclose the lower portion of said winding assembly, including the lower opening in said winding assembly and at least a portion of the space between said winding assembly and ground, said chamber also enclosing said electrical insulating and mounting means, with the bottom portion of said chamber having additional openings therein for allowing said electrical insulating and mounting means to extend therethrough in a close fitting manner.

References Cited by the Examiner
UNITED STATES PATENTS

| | | | |
|---|---|---|---|
| 1,017,348 | 2/1912 | Murray et al. | 336—207 |
| 1,466,253 | 8/1923 | Skinner | 336—59 |
| 3,225,319 | 12/1965 | Trench | 336—92 X |

LEWIS H. MYERS, *Primary Examiner.*
T. J. KOZMA, *Assistant Examiner.*